(12) United States Patent
Nabatchian

(10) Patent No.: US 10,859,684 B1
(45) Date of Patent: Dec. 8, 2020

(54) METHOD AND SYSTEM FOR CAMERA-LIDAR CALIBRATION

(71) Applicant: Amirhosein Nabatchian, Maple (CA)

(72) Inventor: Amirhosein Nabatchian, Maple (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/681,447

(22) Filed: Nov. 12, 2019

(51) Int. Cl.
| | | |
|---|---|---|
| G01S 7/00 | (2006.01) | |
| G01S 7/497 | (2006.01) | |
| G06T 7/80 | (2017.01) | |
| G01S 17/89 | (2020.01) | |
| G06T 7/13 | (2017.01) | |
| G06T 7/11 | (2017.01) | |
| G01S 17/86 | (2020.01) | |
| G01S 17/931 | (2020.01) | |

(52) U.S. Cl.
CPC ............. *G01S 7/497* (2013.01); *G01S 17/86* (2020.01); *G01S 17/89* (2013.01); *G01S 17/931* (2020.01); *G06T 7/11* (2017.01); *G06T 7/13* (2017.01); *G06T 7/80* (2017.01); *G06T 2207/10004* (2013.01); *G06T 2207/10028* (2013.01)

(58) Field of Classification Search
CPC ......... G06T 7/00; G06T 2207/00; G01S 7/00; G01S 17/00
See application file for complete search history.

(56) References Cited

U.S. PATENT DOCUMENTS

2015/0160332 A1   6/2015   Sebastian et al.
2019/0120947 A1*  4/2019   Wheeler ................. G01S 17/42

FOREIGN PATENT DOCUMENTS

| CN | 108198223 A | 6/2018 |
|---|---|---|
| CN | 108399643 A | 8/2018 |
| CN | 108828606 A | 11/2018 |
| CN | 110349221 A | 10/2019 |
| WO | 2019079211 A1 | 4/2019 |

* cited by examiner

*Primary Examiner* — Maryam A Nasri

(57) ABSTRACT

A system and method for performing camera-LIDAR calibration based on a checkerboard placed in proximity to a vehicle, the method includes: receiving a 3D point cloud and a 2D image including the checkerboard; filtering the 3D point cloud representing the checkerboard; converting the filtered 3D point cloud to a 2D point cloud in a translated coordinate system; estimating a 2D position, in the translated coordinate system, for each outer corner of the checkerboard represented by the 2D point cloud; estimating a 2D position in the translated coordinate system for each inner corner of the checkerboard represented by the 2D point cloud; determining a 3D position, in a LIDAR coordinate system, for each corner of the checkerboard in the 3D point cloud based on the corresponding 2D position in the translated coordinate system; and determining a 2D position of each corner of the checkerboard in a 2D image coordinate system.

20 Claims, 8 Drawing Sheets

METHOD AND SYSTEM FOR CAMERA-LIDAR CALIBRATION

FIELD

The present disclosure relates to camera-LIDAR (Light Detection and Ranging) calibration systems and methods. Specifically, the present disclosure relates to calibration between a camera and a LIDAR system using a checkerboard.

BACKGROUND

An autonomous vehicle may use different sensors to sense its surrounding environment, and may process the raw sensor data received from the different sensors using a computer vision software system (hereinafter computer vision system) to perform object detection, classification, regression, and segmentation in order to detect and identify objects of interest (e.g., pedestrians or other cars). LIDAR sensors and camera sensors, such as optical camera sensors, are often used in autonomous vehicles.

In order to represent information sensed by a first sensor (e.g. a camera sensor) in a coordinate system, such as a coordinate system used by a second sensor (e.g. a LIDAR sensor) of the autonomous vehicle, calibration is needed to estimate one or more parameters that affect representation of sensed information in said coordinate system. The calibration of a camera sensor and a LIDAR sensor is to estimate the relative translation and rotation between the two sensors. Translation can include three translational movements in three perpendicular axes x, y, and z. Rotation can include three rotational movements, i.e., roll, yaw and pitch, about the three perpendicular axes x, y, and z.

Camera-LIDAR calibration aims to find accurate rigid-body transformation for extrinsically corresponding camera and LIDAR data points. The output of camera-LIDAR calibration can be a 6 degrees-of-freedom transformation matrix consisting of a translation and a rotation matrix that can map one space to the other one. For example, a calibration result can include a transformation matrix H, which is configured to, based on an input of a given 3D position in the LIDAR coordinate system, generate a corresponding 2D position, in a 2D image coordinate system (e.g. a XY planar coordinate system) as seen by the camera sensor. The transformation matrix H can include a rotation matrix R and a translation matrix T.

Known camera-LIDAR calibration methods usually require one or more rectangular shaped target(s) with multiple checkerboards placed in different positions and at various angles. A checkerboard is commonly placed at a distance from a vehicle which has a LIDAR unit and a camera. Both the LIDAR unit and the camera are directed to generate at least one frame of data containing the checkerboard pattern on the checkerboard. The LIDAR data and the camera data are then used to generate a calibration result between the LIDAR unit and the camera. Additional frames of data may be generated to aid the process. For example, the additional frames of data may be captured based on a checkerboard placed at a different location or at a different angle.

A common calibration method, based on the checkerboard data above and performed by a computer processor, may include the following steps:

a) detecting target checkerboard(s) in 2D image space using known image based pattern detection algorithms;

b) detecting the target checkerboard(s) in 3D LIDAR coordinate system;

c) finding correspondence between 2D image based targets and 3D LIDAR targets;

d) finding key points in 2D image and 3D LIDAR targets; and e) generating a rigid body transformation that can map the LIDAR key points to 2D image key points or vice versa.

However, limitations still exist in current literature of calibration methods, for example due to constraints of the LIDAR equipment or environmental noise. For instance, an existing calibration toolset known as KITTI detects target checkerboard in LIDAR coordinate system by:

a) for each LIDAR point, finding a number of nearest points;

b) based on the nearest points, creating one or more planes and finding surface norm vectors for the plane;

c) clustering surface norm vectors; and d) matching all combinations of three flat surfaces to image-based checkerboards.

A constraint of the KITTI method above is that at least three of the target checkerboards used need to have different surface norm vectors. This method may work when the LIDAR data is dense, for example when with high beam LIDAR (e.g., 64 beams) and the object checkerboards are positioned sufficiently close to the LIDAR unit. But for a more general use case, for example with autonomous driving, where the LIDAR 3D data may be sparse or when the objects may be far, the KITTI method may not work, because the number of LIDAR beams that hit the target(s) is limited (e.g., with 16 or 32 LIDAR beams) and the distance between any two adjacent beams can be large. Surface norm vector creation based on nearest points tends to fail when the distance between LIDAR beams is large and the points in the neighborhood for nearest neighbor's search do not form a flat surface.

In addition to the problems with low beam LIDAR scans and far distance to the targets, when there are no anchors for LIDAR versus image point clouds, search for correspondences becomes complex for scenes with multiple flat surfaces. Moreover, there is some degree of randomness involved in brute matching of LIDAR surfaces to image surfaces. All these issues make these existing calibration methods such as KITTI not suitable for camera-LIDAR calibration on a commercial or industrial level, where large fleets of autonomous cars require robust calibration results between a camera unit and a LIDAR unit.

SUMMARY

The present disclosure provides methods and systems for generating a camera-LIDAR calibration result.

In some example aspects, the present disclosure describes a method for performing camera-LIDAR calibration based on a checkerboard placed in proximity to a vehicle, the method includes: receiving, from a LIDAR unit of the vehicle, a three-dimensional (3D) point cloud including the checkerboard; receiving, from a camera of the vehicle, a 2D image including the checkerboard; filtering the 3D point cloud to generate a filtered 3D point cloud representing the checkerboard; converting the filtered 3D point cloud representing the checkerboard to a 2D point cloud representing the checkerboard in a translated coordinate system; estimating a 2D position, in the translated coordinate system, for each outer corner of the checkerboard represented by the 2D point cloud; estimating a 2D position in the translated coordinate system for each inner corner of the checkerboard represented by the 2D point cloud; determining and storing in a database, a 3D position, in a LIDAR coordinate system, for each outer corner of the checkerboard included in the 3D point cloud based on the 2D position for the corresponding outer corner in the translated coordinate system; determining and storing in the database, a 3D position, in the LIDAR coordinate system, for each inner corner of the checkerboard included in the 3D point cloud based on the 2D position for the corresponding inner corner in the translated coordinate system; and determining and storing in the database, a 2D position of each outer corner and each inner corner of the checkerboard in a 2D image coordinate system.

In some embodiments, the method may include: generating a calibration result based on the 3D position in the LIDAR coordinate system and the 2D position in the 2D image coordinate system of each outer corner and each inner corner of the checkerboard, wherein the generated calibration result is a transformation matrix.

In some embodiments, the method may include: generating a calibrated 2D position in the 2D image coordinate system, using the generated calibration result, for each of a plurality of corners of the checkerboard based on the respective 3D position of the respective corner from the plurality of corners of the checkerboard, the plurality of corners comprising a plurality of the outer corners of the checkerboard and a plurality of the inner corners of the checkerboard.

In some embodiments, the method may include: calculating, for each of the plurality of corners of the checkerboard, a calibration error between the calibrated 2D position and the 2D position of the corner; generating a mean squared error based on the calculated errors for all of the plurality of corners of the checkerboard; and determining if additional 3D point cloud and 2D image including the checkerboard from a new vehicle position are required based on comparing the mean squared error with a threshold.

In some embodiments, the method may include in an iterative manner: receiving a new position of the vehicle; receiving, from the LIDAR unit of the vehicle, a second three-dimensional (3D) point cloud including the checkerboard; receiving, from a camera of the vehicle, a second 2D image including the checkerboard; filtering the second 3D point cloud to generate a second filtered 3D point cloud representing the checkerboard based on the new position of the vehicle; converting the second filtered 3D point cloud representing the checkerboard to a second 2D point cloud representing the checkerboard in a translated coordinate system; estimating a 2D position, in the translated coordinate system, for each outer corner of the checkerboard represented by the second 2D point cloud; estimating a 2D position in the translated coordinate system, for each inner corner of the checkerboard represented by the second 2D point cloud; determining and storing in the database, a 3D position, in a LIDAR coordinate system, for each outer corner of the checkerboard included in the second 3D point cloud based on the 2D position for the corresponding outer corner in the translated coordinate system; determining and storing in the database, a 3D position, in the LIDAR coordinate system, for each inner corner of the checkerboard included in the second 3D point cloud based on the 2D position for the corresponding inner corner in the translated coordinate system; and determining and storing in the database, a 2D position of each outer corner and each inner corner of the checkerboard in a 2D image coordinate system.

In some embodiments, the method may include: generating a calibration result based on the 3D positions in the LIDAR coordinate system and the 2D positions in the 2D image coordinate system stored in the database for the checkerboard across all 3D point clouds and corresponding 2D positions of the checkerboard; generating a calibrated 2D position, using the generated calibration result, for each of a plurality of corners of the checkerboard based on the respective 3D position of the respective corner from the plurality of corners of the checkerboard stored in the database, the plurality of corners comprising a plurality of the outer corners of the checkerboard and a plurality of the inner corners of the checkerboard; generating a mean squared error based on a plurality of calculation errors, each calculation error computed between the calibrated 2D position and a corresponding 2D position of each respective corner from the plurality of corners of the checkerboard stored in the database; and determining if additional 3D point cloud and 2D image including the checkerboard based on another new vehicle position are required based on comparing the mean squared error with a threshold.

In some embodiments, filtering the 3D point cloud may include: determining a bounding box that includes the checkboard based on a position of the vehicle; and filtering out the 3D data points outside of the bounding box.

In some embodiments, converting the filtered 3D point cloud to the 2D point cloud in the translated coordinate system may include executing a Principal Component Analysis (PCA) method to eliminate a dimension representing a depth of the checkerboard.

In some embodiments, estimating the 2D position in the translated coordinate system, for each inner corner of the checkerboard represented by the 2D point cloud may include: determining a total number of inner corners along each side of the checkerboard included in the 2D image; and determining the 2D position of the corresponding inner corners of the checkerboard by interpolating, using the total number of inner corners along each side of the checkerboard in the 2D image in the translated coordinate system, the 2D position of the outer corners of the checkerboard in the translated coordinate system.

In another aspect of the present disclosure, there is provided a processing system for performing calibration of a camera and a light detection and ranging (LIDAR) scanning sensor of a vehicle, the processing system includes: a processing unit; and a memory coupled to the processing unit, the memory storing machine-executable instructions that, when executed by the processing unit, cause the processing system to: receive, from a LIDAR unit of the vehicle, a 3D point cloud including the checkerboard; receive, from a camera of the vehicle, a 2D image including the checkerboard; filter the 3D point cloud to generate a filtered 3D point cloud representing the checkerboard; convert the filtered 3D point cloud representing the checkerboard to a 2D point cloud representing the checkerboard in a translated coordinate system; estimate a 2D position, in the translated coordinate system, for each outer corner of the checkerboard represented by the 2D point cloud; estimate a 2D position in the translated coordinate system, for each inner corner of the checkerboard represented by the 2D point cloud; determine and store in a database, a 3D position, in a LIDAR coordinate system, for each outer corner of the checkerboard included in the 3D point cloud based on the 2D position for the corresponding outer corner in the translated coordinate system; determine and store in the database, a 3D position, in the LIDAR coordinate system, for each inner corner of the checkerboard included in the 3D point cloud based on the 2D position for the corresponding inner corner in the translated coordinate system; and determine and store in the database, a 2D position of each outer corner and each inner corner of the checkerboard in a 2D image coordinate system.

In some embodiments, the instructions, when executed by the processing unit, cause the apparatus to generate a calibration result based on the 3D position in the LIDAR coordinate system and the 2D position in the 2D image coordinate system of each outer corner and each inner corner of the checkerboard, and wherein the generated calibration result is a transformation matrix.

In some embodiments, the instructions, when executed by the processing unit, cause the apparatus to generate a calibrated 2D position in the 2D image coordinate system, using the generated calibration result, for each of a plurality of corners of the checkerboard based on the respective 3D position of the respective corner from the plurality of corners of the checkerboard, the plurality of corners comprising a plurality of the outer corners of the checkerboard and a plurality of the inner corners of the checkerboard.

In some embodiments, the instructions, when executed by the processing unit, cause the apparatus to: calculate, for each of the plurality of corners of the checkerboard, a calibration error between the calibrated 2D position and the 2D position of the corner; generate a mean squared error based on the calculated errors for all of the plurality of corners of the checkerboard; and determine if additional 3D point cloud and 2D including the checkerboard from a new vehicle position are required based on comparing the mean squared error with a threshold.

In some embodiments, the instructions, when executed by the processing unit, cause the apparatus to, in an iterative manner: receive a new position of the vehicle; receive, from the LIDAR unit of the vehicle, a second three-dimensional (3D) point cloud including the checkerboard; receive, from a camera of the vehicle, a second 2D image including the checkerboard; filter the second 3D point cloud to generate a second filtered 3D point cloud representing the checkerboard based on the new position of the vehicle; convert the second filtered 3D point cloud representing the checkerboard to a second 2D point cloud representing the checkerboard in a translated coordinate system; estimate a 2D position, in the translated coordinate system, for each outer corner of the checkerboard represented by the second 2D point cloud; estimate a 2D position in the translated coordinate system, for each inner corner of the checkerboard represented by the second 2D point cloud; determine and store in the database, a 3D position, in a LIDAR coordinate system, for each outer corner of the checkerboard included in the second 3D point cloud based on the 2D position for the corresponding outer corner in the translated coordinate system; determine and store in the database, a 3D position, in the LIDAR coordinate system, for each inner corner of the checkerboard included in the second 3D point cloud based on the 2D position for the corresponding inner corner in the translated coordinate system; and determine and store in the database, a 2D position of each outer corner and each inner corner of the checkerboard in a 2D image coordinate system.

In some embodiments, the instructions, when executed by the processing unit, cause the apparatus to: generate a calibration result based on the 3D positions in the LIDAR coordinate system and the 2D positions in the 2D image coordinate system stored in the database for the checkerboard across all 3D point clouds and corresponding 2D positions of the checkerboard; generate a calibrated 2D position, using the generated calibration result, for each of a plurality of corners of the checkerboard based on the respective 3D position of the respective corner from the plurality of corners of the checkerboard stored in the database, the plurality of corners comprising a plurality of the outer corners of the checkerboard and a plurality of the inner corners of the checkerboard; generate a mean squared error based on a plurality of calculation errors, each calculation error computed between the calibrated 2D position and a corresponding 2D position of each respective corner from the plurality of corners of the checkerboard stored in the database; and determine if additional 3D point cloud and 2D including the checkerboard based on another new vehicle position are required based on comparing the mean squared error with a threshold.

In some embodiments, filtering the 3D point cloud may include: determining a bounding box that includes the checkboard based on a position of the vehicle; and filtering out the 3D data points outside of the bounding box.

In some embodiments, converting the filtered 3D point cloud to the 2D point cloud in the translated coordinate system may include executing a Principal Component Analysis (PCA) method to eliminate a dimension representing a depth of the checkerboard.

In some embodiments, estimating the 2D position in the translated coordinate system, for each inner corner of the checkerboard represented by the 2D point cloud may include: determining a total number of inner corners along each side of the checkerboard included in the 2D image; and determining the 2D position of the corresponding inner corners of the checkerboard by interpolating, using the total number of inner corners along each side of the checkerboard in the 2D image in the translated coordinate system, based on the 2D position of the outer corners of the checkerboard in the translated coordinate system.

In yet another aspect of the present disclosure, there is provided a non-transitory machine readable medium having tangibly stored thereon executable instructions for execution by at a processor of a vehicle control system of a vehicle to: receive, from a LIDAR unit of the vehicle, a 3D point cloud including the checkerboard; receive, from a camera of the vehicle, a 2D image including the checkerboard; filter the 3D point cloud to generate a filtered 3D point cloud representing the checkerboard; convert the filtered 3D point cloud representing the checkerboard to a 2D point cloud representing the checkerboard in a translated coordinate system; estimate a 2D position, in the translated coordinate system, for each outer corner of the checkerboard represented by the 2D point cloud; estimate a 2D position in the translated coordinate system, for each inner corner of the checkerboard represented by the 2D point cloud; determine and store in a database, a 3D position, in a LIDAR coordinate system, for each outer corner of the checkerboard included in the 3D point cloud based on the 2D position for the corresponding outer corner in the translated coordinate system; determine and store in the database, a 3D position, in the LIDAR coordinate system, for each inner corner of the checkerboard in the 3D point cloud based on the 2D position for the corresponding inner corner in the translated coordinate system; and determine and store in the database, a 2D position of each outer corner and each inner corner of the checkerboard in a 2D image coordinate system.

In some embodiments, the non-transitory machine readable medium has tangibly stored thereon further executable instructions to generate a calibration result based on the 3D position in the LIDAR coordinate system and the 2D position in the 2D image coordinate system of each outer corner and each inner corner of the checkerboard, wherein the generated calibration result is a transformation matrix.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Autonomous vehicles are described as benefiting from examples of the present disclosure. However, the methods and systems disclosed herein may also be beneficial for and/or implemented outside of autonomous devices, for example in non-vehicular devices, and non-autonomous devices. For example, any system or device that uses a computer vision system for object detection, classification, regression, and segmentation may benefit from examples disclosed herein. In the present disclosure, a computer vision system may include any camera-LIDAR calibration algorithm which may be used for object detection, classification, regression, and segmentation. Further, examples of the present disclosure may be implemented in image processing devices, such as workstations (e.g., image processing workstations), or other computing devices not related to autonomous machines.

Although examples described herein refer to a car as the autonomous vehicle, the teachings of the present disclosure may be relevant to other forms of autonomous or semi-autonomous vehicles including, for example, trams, subways, trucks, buses, watercraft, aircraft, ships, drones (also called unmanned aerial vehicles (UAVs)), warehouse equipment, construction equipment or farm equipment, and may include vehicles that do not carry passengers as well as vehicles that do carry passengers. The methods and systems disclosed herein may also be relevant to non-vehicular devices, for example autonomous vacuum cleaners and lawn mowers.

Figure 1A:
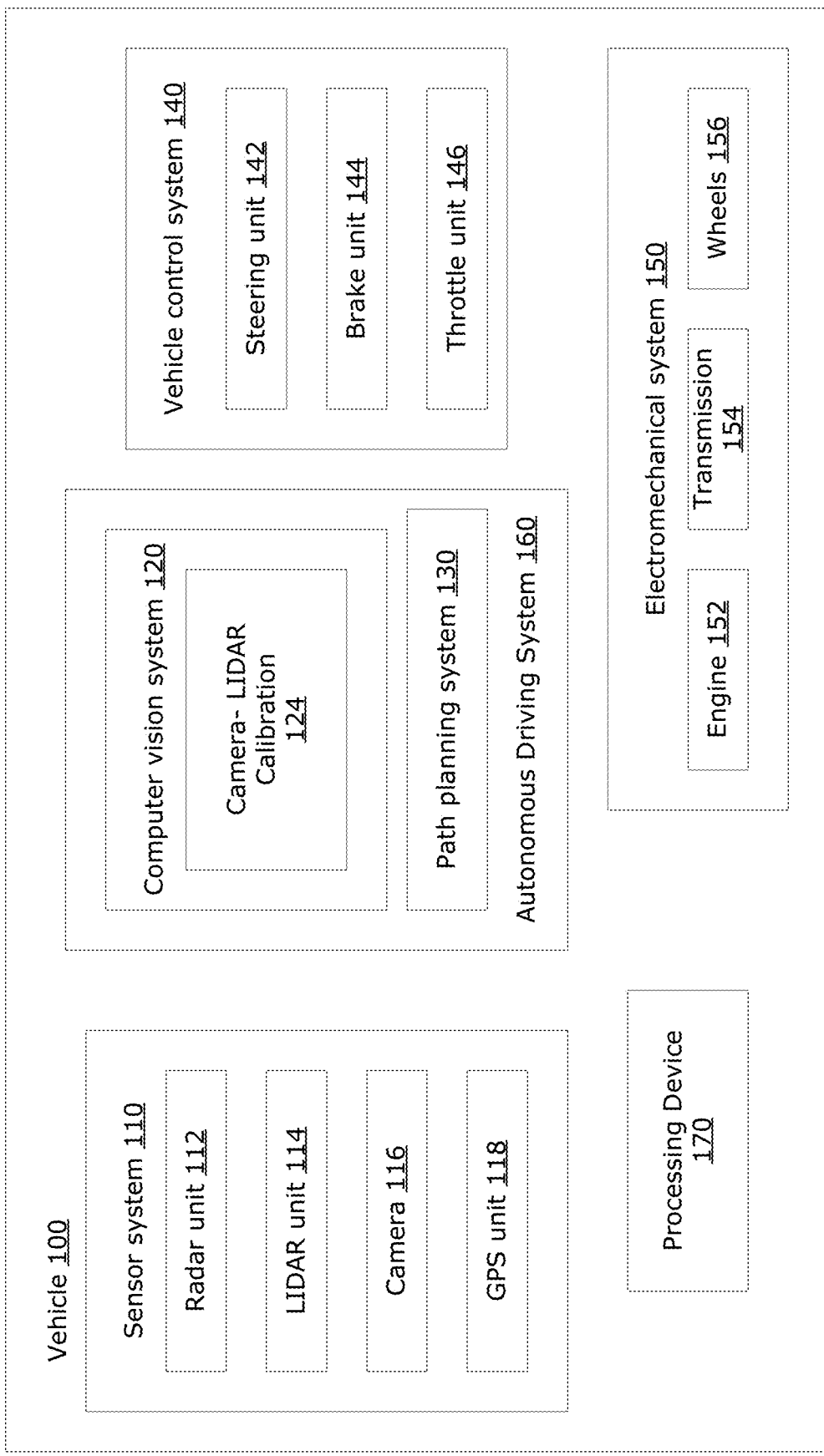
FIG. 1A is a block diagram illustrating some components of an example autonomous vehicle.

FIG. 1A is a block diagram illustrating certain components of an example autonomous vehicle 100. Although described as being autonomous, the vehicle 100 may be operable in a fully-autonomous, semi-autonomous or fully user-controlled mode. In the present disclosure, the vehicle 100 is described in the embodiment of a car, however the present disclosure may be implemented in other vehicular or non-vehicular machines, as discussed above. The vehicle 100 may benefit from examples disclosed herein.

The vehicle 100 includes a sensor system 110, an autonomous driving system 160 including a computer vision system 120 and a path planning system 130, a vehicle control system 140, an electromechanical system 150, and a processing device 170, for example. Other systems and components may be included in the vehicle 100 as appropriate. Various systems and components of the vehicle may communicate with each other, for example through wired or wireless communication. For example, the sensor system 110 may communicate with the computer vision system 120 and the path planning system 130 in the autonomous driving system 160, the processing device 170, and the vehicle control system 140; the computer vision system 120 may communicate with the path planning system 130, the processing device 170, and the vehicle control system 140; the path planning system 130 may communicate with the processing device 170 and the vehicle control system 140; and the vehicle control system 140 may communicate with the electromechanical system 150.

The sensor system 110 includes various sensing units for collecting information about the internal and/or external environment of the vehicle 100. In the example shown, the sensor system 110 includes a radar unit 112, a LIDAR unit 114, a camera 116 and a global positioning system (GPS) unit 118 for collecting information about the external environment of the vehicle 100. The sensor system 110 may include other sensing units, such as a temperature sensor, precipitation sensor or microphone, among other possibilities.

In some embodiments, the processing device 170 receives sensor data from the camera 116, and generates 2D images based on the sensor data received the camera unit 116. The processing device 170 also receives sensor data from the LIDAR unit 114 mounted on the vehicle 100 and generates 3D point clouds based on the sensor data received from the LIDAR unit 114. Alternatively, in some embodiments, the camera 116 and the LIDAR unit 114 can each provide 2D images and 3D point clouds respectively to the processing device 170 of the vehicle 100. The computer vision system 120 can in some embodiments be implemented as a software system which is part of the autonomous driving system 160 ("ADS 160") of the vehicle 100. The computer vision system 120 can receive 2D images and/or 3D point clouds from the processing device 170, and output detected objects in the 2D images or 3D point clouds to other software systems of the ADS 160, such as the path planning system 130.

The camera 116 may capture an image and/or video comprising a set of images, for example, and may generate image data representative of each image captured by the camera 116. In some embodiments, the image data captured by the camera 116 is two-dimensional (2D) image data representative of a 2D image capture by the camera 116. Each set of 2D image data representative of a 2D image corresponds to a particular time point. In the present disclosure, the term 2D image data may be used to generally refer to data representative of a single 2D image. The term 2D image data may also be referred to as 2D data. Each pixel in the 2D image may encode red, green, blue (RGB) intensity values. Generally, a set of 2D image data may include a set of 2D data points (also referred to as pixels, in the case of 2D image data) taken at the same time point. Each 2D data point may be represented as a data value stored in a 2D matrix, where the location of each entry in the 2D matrix corresponds to the location of a respective 2D data point. In some embodiments, a 2D image taken from a camera 116 captures an environment in proximity to the vehicle 100; and in particular, an environment including a checkerboard placed in proximity to the vehicle 100.

The LIDAR unit 114 may capture information in a wide view (e.g., 360° view) about the vehicle 100. The LIDAR unit 114 captures three-dimensional (3D) information about the environment, and generates a set of data points in 3D coordinate system. The set of data points in 3D space is generally referred to as a 3D point cloud, where each data point in the 3D point cloud represents the 3D coordinates (e.g., x, y and z values in meters) of a sensed object in 3D coordinate system (e.g., representing the point of origin from which light is reflected from the object). A set of 3D point cloud corresponds to a particular time point. It should be noted that a set of 3D point cloud may correspond to a time point that coincides or nearly coincides with a set of 2D image data. In the present disclosure, the term 3D point cloud may be used to generally refer to a single set of 3D data, or a 3D dataset. The data points in a 3D point cloud may be irregularly spaced, depending on the external environment. In some examples, in addition to 3D coordinates, each data point in the 3D point cloud may also contain other information, such as intensity of reflected light or time of detection. Generally, a set of 3D point cloud may include a set of 3D data points, where each data point may be represented as a vector containing values of x, y, and z coordinates, and optionally other values (e.g., additional information such as intensity of reflected light or time of detection). The 3D data points, represented by vectors, may be arranged in a matrix where each row of the matrix corresponds to a respective 3D data point.

Generally, a 3D point cloud (such as 3D data generated by the LIDAR unit 114) may be relatively sparse, compared to the corresponding set of 2D image data (such as 2D image data generated by the camera 116). For example, a typical set of 2D image data may be composed of an ordered array of 1920×1080 pixels and capture a planar field-of-view (FOV). In comparison, a 3D point cloud received from the LIDAR unit 114 may include an unordered set of data points over a 360° FOV, captured over 1800 scanning columns and 16 or 32 scanning rows. Thus, the 3D point cloud may include data points over a wider FOV and with lower resolution than the 2D image. Accordingly, the 3D point cloud may be described herein as sparse 3D point cloud.

Using the various sensing units 112, 114, 116, 118, the sensor system 110 may collect information about the local external environment of the vehicle 100 (e.g., any immediately surrounding obstacles) as well as information from a wider vicinity (e.g., the radar unit 112 and LIDAR unit 114 may collect information from an area of up to 100 m radius or more around the vehicle 100). The sensor system 110 may also collect information about the position and orientation of the vehicle 100 relative to a frame of reference (e.g., using the GPS unit 118). The sensor system 110 may further collect information about the vehicle 100 itself. In such a case, the vehicle 100 may itself be considered part of the sensed environment. For example, the sensor system 110 may collect information from sensing units (e.g., accelerometers, speedometer, odometer and/or inertial measurement unit), which may or may not be part of the sensor system 110, to determine the state of the vehicle 100, such as linear speed, angular speed, acceleration and tire grip of the vehicle 100. The sensor system 110 may repeatedly (e.g., in regular intervals) receive information from its sensing units in real-time. The sensor system 110 may in turn provide sensor data in real-time or near real-time to other components of the vehicle 100.

The sensor system 110 communicates with the computer vision system 120 to provide sensor data, including 2D image data and 3D point cloud to the computer vision system 120, which has been implemented to detect and identify objects in the external environment, for example to detect and identify a pedestrian or another car. The computer vision system 120 may use any suitable modules (e.g., using machine learning processes) to perform object detection, classification, regression, and segmentation on 2D image data and 3D point cloud to detect and identify objects. The computer trained vision system 120 in this example includes modules that execute a camera-LIDAR calibration process 124 to generate a calibration result, prior to performing object detection, classification, regression, and segmentation on 2D image data and 3D point cloud. In some embodiments, the camera-LIDAR calibration process 124 may be executed only once prior to performing object detection, classification, regression, and segmentation on 2D image data and 3D point cloud. In some embodiments, the camera-LIDAR calibration process 124 may be executed multiple times. In some embodiments, the camera-LIDAR calibration process 124 may be performed only once during a specific time period.

The modules of the computer vision system 120 may be implemented using software, which may include any number of independent or interconnected modules. For example, the computer vision system 120 may be implemented using a dedicated image processor, or may be implemented using one or more general processors of a vehicle controller (not shown) of the vehicle 100. The computer vision system 120 may repeatedly (e.g., in regular intervals) receive sensor data from the sensor system 110 and perform object detection, classification, regression, and segmentation to detect and identify objects in real-time or near real-time. The output of the computer visions system 120 may include, for example identification of detected objects, including object class, object bounding boxes, objection segments (e.g., object masks), object location and object boundary, in 2D and/or 3D coordinate system.

Sensor data from the sensor system 110 and the output from the computer visions system 120 may be provided to the path planning system 130. The path planning system 130 carries out path planning for the vehicle 100. For example, the path planning system 130 may plan a path for the vehicle 100 to travel from a starting point to a target destination, using information from the GPS unit 118. The path planning system 130 may be implemented as one or more software modules or control blocks carried out by one or more processors in the vehicle 100. In some examples, the path planning system 130 may perform path planning at different levels of detail, for example on a mission planning level, on a behavior planning level, and on a motion planning level. The output from the path planning system 130 may include data defining one or more planned paths for the vehicle 100 to travel. The path planning carried out by the path planning system 130 is performed in real-time or near real-time, to enable the vehicle 100 to be responsive to real-time changes in the sensed environment. Output from the path planning system 130 may be provided to the vehicle control system 140.

The vehicle control system 140 serves to control operation of the vehicle 100. The vehicle control system 140 may be used to provide full, partial or assistive control of the vehicle 100. The vehicle control system 140 may serve to fully or partially control operation of the electromechanical system 150, when the vehicle 100 is operating autonomously or semi-autonomously, based on the planned path from the path planning system 130. Information from the sensor system 110 and/or the computer vision system 120 may also be used by the vehicle control system 140 to generate control signals for the vehicle 100. In this example, the vehicle control system 140 includes a steering unit 142, a brake unit 144 and a throttle unit 146. Each of these units 142, 144, 146 may be implemented as separate or integrated software modules or control blocks within the vehicle control system 140. The units 142, 144, 146 generate control signals to control the steering, braking and throttle, respectively, of the vehicle 100. The vehicle control system 140 may include additional components to control other aspects of the vehicle 100 including, for example, control of turn signals and brake lights.

The electromechanical system 150 receives control signals from the vehicle control system 140 to operate the mechanical components of the vehicle 100. The electromechanical system 150 effects physical operation of the vehicle 100. In the example shown, the electromechanical system 150 includes an engine 152, a transmission 154 and wheels 156. The engine 152 may be a gasoline-powered engine, an electricity-powered engine, or a gasoline/electricity hybrid engine, for example. Other components may be included in the electromechanical system 150, including, for example, turn signals, brake lights, fans and windows.

The vehicle 100 may include other components that are not shown, including, for example, a user interface system and a wireless communication system (e.g., including an antenna). These other components may also provide input to and/or receive output from the above-described systems. The vehicle 100 may communicate with an external system, for example an external map database. The vehicle 100 may also communicate with a network, for example a vehicle network that enables communication among autonomous, semi-autonomous or non-autonomous vehicles.

The sensor system 110, autonomous driving system 160, computer vision system 120, path planning system 130 and the vehicle control system 140 may be individually or in combination be realized, at least in part, in one or more processors of the vehicle 100.

Figure 1B:
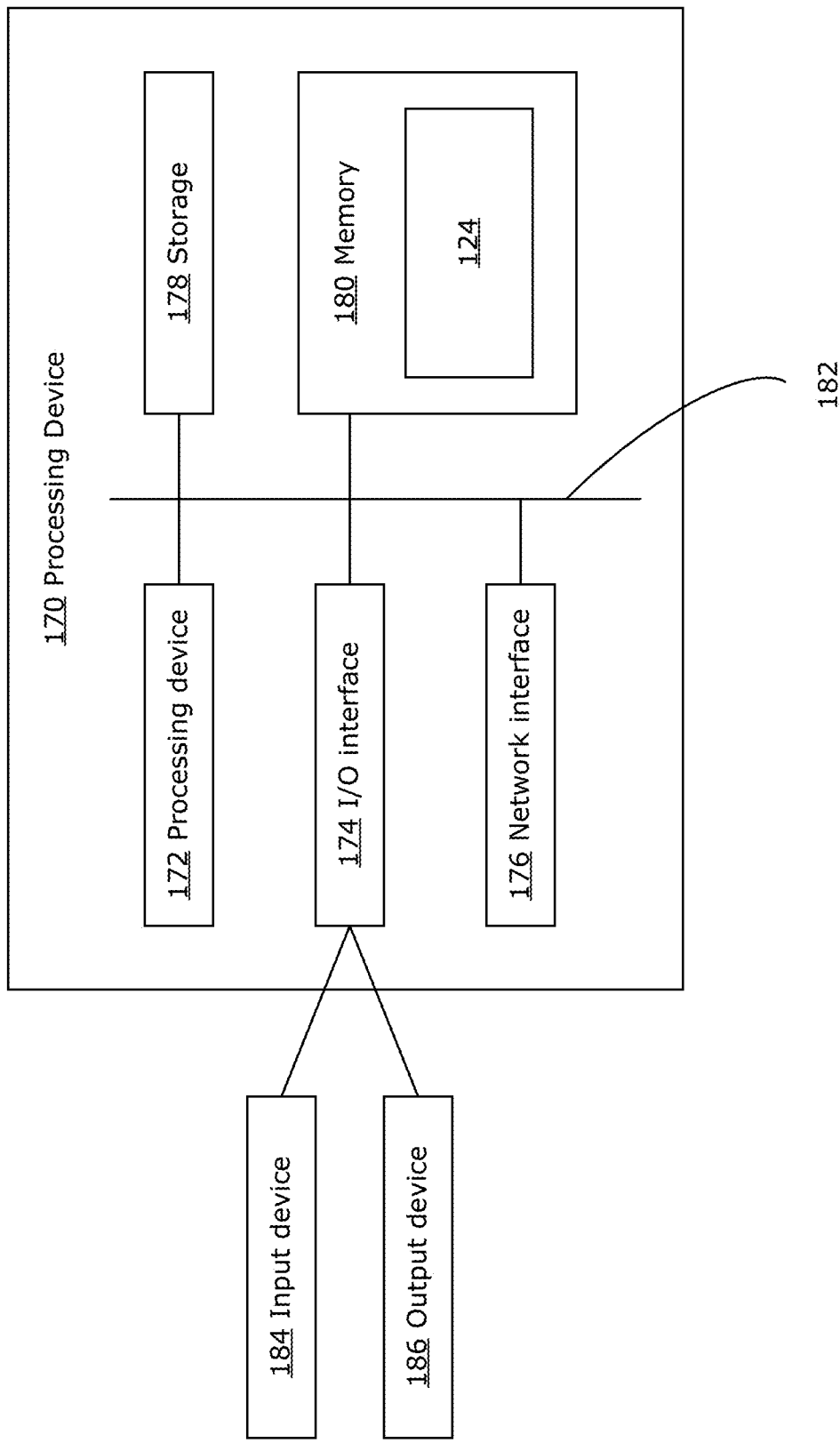
FIG. 1B is a block diagram illustrating an example processing system suitable for implementing examples disclosed herein.

FIG. 1B is a block diagram of an example simplified processing device 170, which may be used to perform the camera-LIDAR calibration process 124, in accordance with examples disclosed herein. The processing device 170 can be any physical or virtual machine that includes a processing unit 172 that executes instructions stored in memory 180 to perform the camera-LIDAR calibration process 124.

The processing device 170 could be a server or a desktop terminal, for example, or any suitable processing system. Other processing units suitable for implementing embodiments described in the present disclosure may be used, which may include components different from those discussed below. Although FIG. 1B shows a single instance of each component, there may be multiple instances of each component in the processing device 170.

The processing device 170 may include one or more processing units 172, such as a processor, a microprocessor, an application-specific integrated circuit (ASIC), a field-programmable gate array (FPGA), a dedicated logic circuitry, or combinations thereof. The processing device 170 may also include one or more input/output (I/O) interfaces 174, which may enable interfacing with one or more appropriate input devices 184 and/or output devices 186. The processing device 170 may include one or more network interfaces 176 for wired or wireless communication with a network (e.g., an intranet, the Internet, a P2P network, a WAN and/or a LAN) or other node. The network interfaces 176 may include wired links (e.g., Ethernet cable) and/or wireless links (e.g., one or more antennas) for intra-network and/or inter-network communications.

The processing device 170 may also include one or more storage units 178, which may include a mass storage unit such as a solid state drive, a hard disk drive, a magnetic disk drive and/or an optical disk drive. The processing device 170 may include one or more memories 180, which may include a volatile or non-volatile memory (e.g., a flash memory, a random access memory (RAM), and/or a read-only memory (ROM)). The non-transitory memory(ies) 180 may store instructions for execution by the processing units (s) 172, such as to carry out examples described in the present disclosure. The memory(ies) 180 may include other software instructions, such as for implementing an operating system and other applications/functions. In some examples, one or more data sets and/or modules may be provided by an external memory (e.g., an external drive in wired or wireless communication with the processing device 170) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 182 providing communication among components of the processing device 170, including the processing unit(s) 172, I/O interface(s) 174, network interface(s) 176, storage unit(s) 178 and/or memory(ies) 180. The bus 182 may be any suitable bus architecture including, for example, a memory bus, a peripheral bus or a video bus.

In FIG. 1B, the input device(s) 184 (e.g., a keyboard, a mouse, a microphone, a touchscreen, and/or a keypad) and output device(s) 186 (e.g., a display, a speaker and/or a printer) are shown as external to the processing device 170. In other examples, one or more of the input device(s) 184 and/or the output device(s) 186 may be included as a component of the processing device 170. In other examples, there may not be any input device(s) 184 and output device(s) 186, in which case the I/O interface(s) 174 may not be needed.

Figure 2:
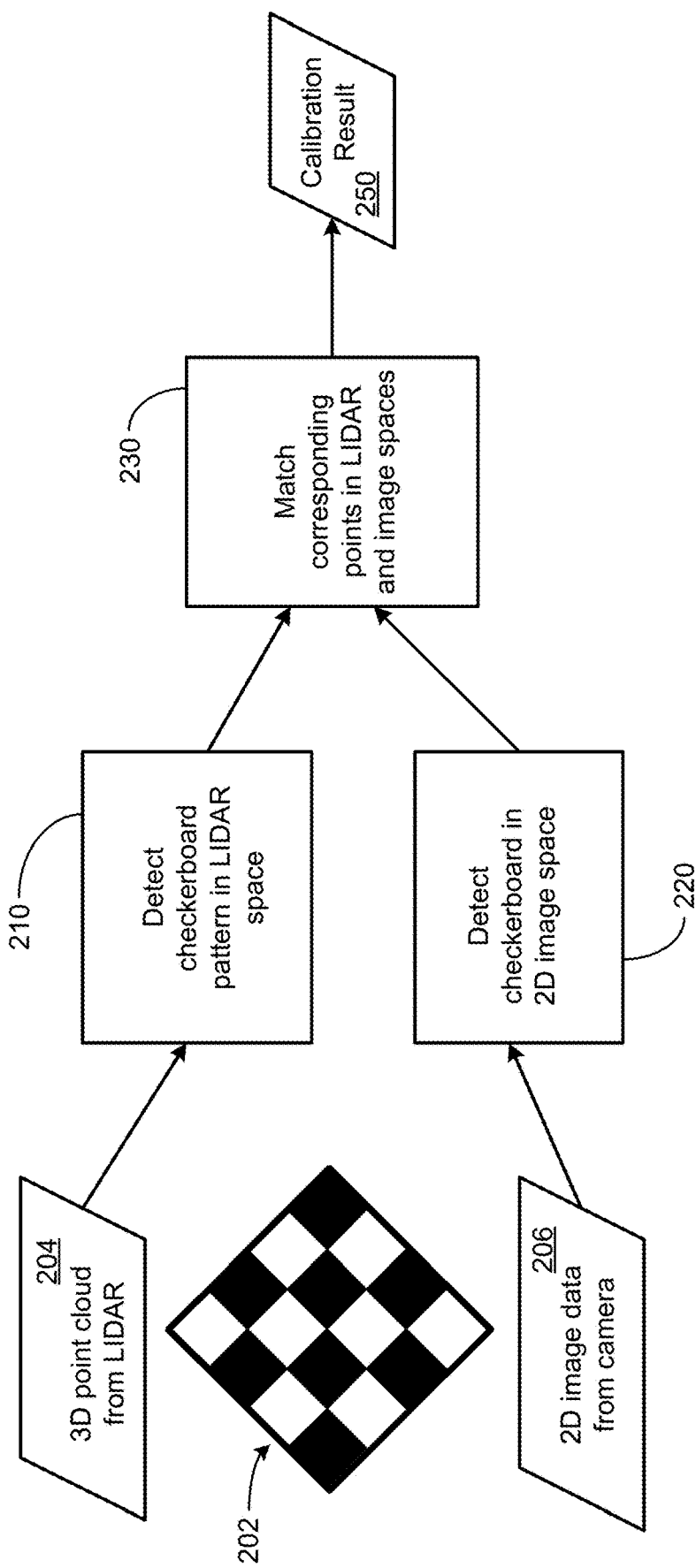
FIG. 2 is a block diagram illustrating an example process for camera-LIDAR calibration.

The memory(ies) 180 may store machine executable instructions of a camera-LIDAR calibration 124. The camera-LIDAR calibration module 124 is configured to perform a camera-LIDAR calibration process. The machine readable instructions of the camera-LIDAR calibration module 124, when executed by the processing unit 172 of the processing device 170, causes the processing device 170 to, generate a calibration result based on sensor data from the LIDAR unit 114 and the camera 116. For example, as shown in FIG. 2, the processing device 170 receives 3D point cloud 204 from the LIDAR unit 114 as well as 2D image data 206 for a 2D image captured by the camera unit 116. The 3D point cloud 204 and the 2D image data 206 each contain data points representative of a checkerboard 202 (and its immediate surroundings) placed at a distance to the vehicle 100. In some examples, other information (e.g., time stamp, time-of-flight, intensity level or other information) may be associated with each 3D data point.

The 3D point cloud 204 may be used in a sub-process 210 to detect the checkerboard pattern included in the 3D point cloud 204 in LIDAR coordinate system, while 2D image data 206 may be used in a sub-process 220 to detect the checkerboard pattern included in 2D image data 206. Next, in a sub-process 230, which is described in detail below, corresponding data points in 3D LIDAR coordinate system and 2D image space are matched to generate a calibration result 250, which may include a transformation matrix H, including a rotation matrix R and a translation matrix T.

In some embodiments, the transformation matrix H includes a rotation matrix R and a translation matrix T. Specifically, the rotation matrix R and the translation matrix T can be used to generate a 2D position coordinate $P_C$ in camera space, i.e., a 2D image coordinate system used by the camera 116, based on a given 3D coordinate PL in LIDAR coordinate system. For example, a data point of 3D point cloud 204 received from the LIDAR unit 114 has a 3D coordinate $P_L=[X_L, Y_L, Z_L]$ in the LIDAR coordinate system. Typically, the origin of the LIDAR coordinate system is the LIDAR unit 114 itself. Similarly, a data point in a 2D image data 206 received from the camera 116 has a camera coordinate $P_C=[X_C, Y_C, Z_C]$ in the camera coordinate system. Typically, the origin of the camera coordinate system [0, 0] is the camera 116 itself. The transformation from $P_L$ to $P_C$ is then obtained by the formula:

$$P_C = RP_L + T$$

where R is a 3×3 matrix and T is a 3×1 matrix.

The rotation matrix R can be represented as $$R = \begin{bmatrix} r_{11} & r_{12} & r_{13} \\ r_{21} & r_{22} & r_{23} \\ r_{31} & r_{32} & r_{33} \end{bmatrix},$$

where $r_{ij}$ are the elements of the rotation matrix.

The translation matrix T can be represented as $$T = \begin{bmatrix} t_1 \\ t_2 \\ t_3 \end{bmatrix},$$

where $t_{ij}$ are the elements of the translation matrix.

In some embodiments, the calibration result can be a 3×4 camera projection matrix P used to define how a data point of a 3D point cloud is projected or mapped to a 2D position in a 2D image plane or a 2D image coordinate system. Where 2D image data represents a 2D image captured by an actual camera, 2D image data 206 is a projection of the data points of a 3D point cloud 206 into the 2D image plane or 2D image coordinate system, and the camera projection matrix P represents the transformation that is used to project the data points of 3D point cloud 206 into the 2D image plane or 2D image coordinate system. Using the camera projection matrix P, the data points of the 3D point cloud 206 can be related to the data points in the 2D image data 204 according to the following equation:

$$v = PV$$

which may be written as:

$$\begin{bmatrix} r \\ c \\ 1 \end{bmatrix} = \begin{bmatrix} a_{00} & a_{01} & a_{02} & a_{03} \\ a_{10} & a_{11} & a_{12} & a_{13} \\ a_{20} & a_{21} & a_{22} & a_{23} \end{bmatrix} \begin{bmatrix} X \\ Y \\ Z \end{bmatrix}$$

where $a_{ij}$ are the elements of the camera projection matrix P, V=[X, Y, Z] defines the x, y and z coordinates of a data point in the 3D point cloud 204, and v=(r,c) defines the row r and column c location of the data point when projected into the 2D image plane or 2D image coordinate system. Where appropriate, the values of r and c may be quantized such that they map to integer locations in the 2D image data 206, that is, when the row number $r_i$ and column number $c_i$ in each 2D position $[r_i, c_i]$ in the 2D image data 206 are integers.

Figure 3:
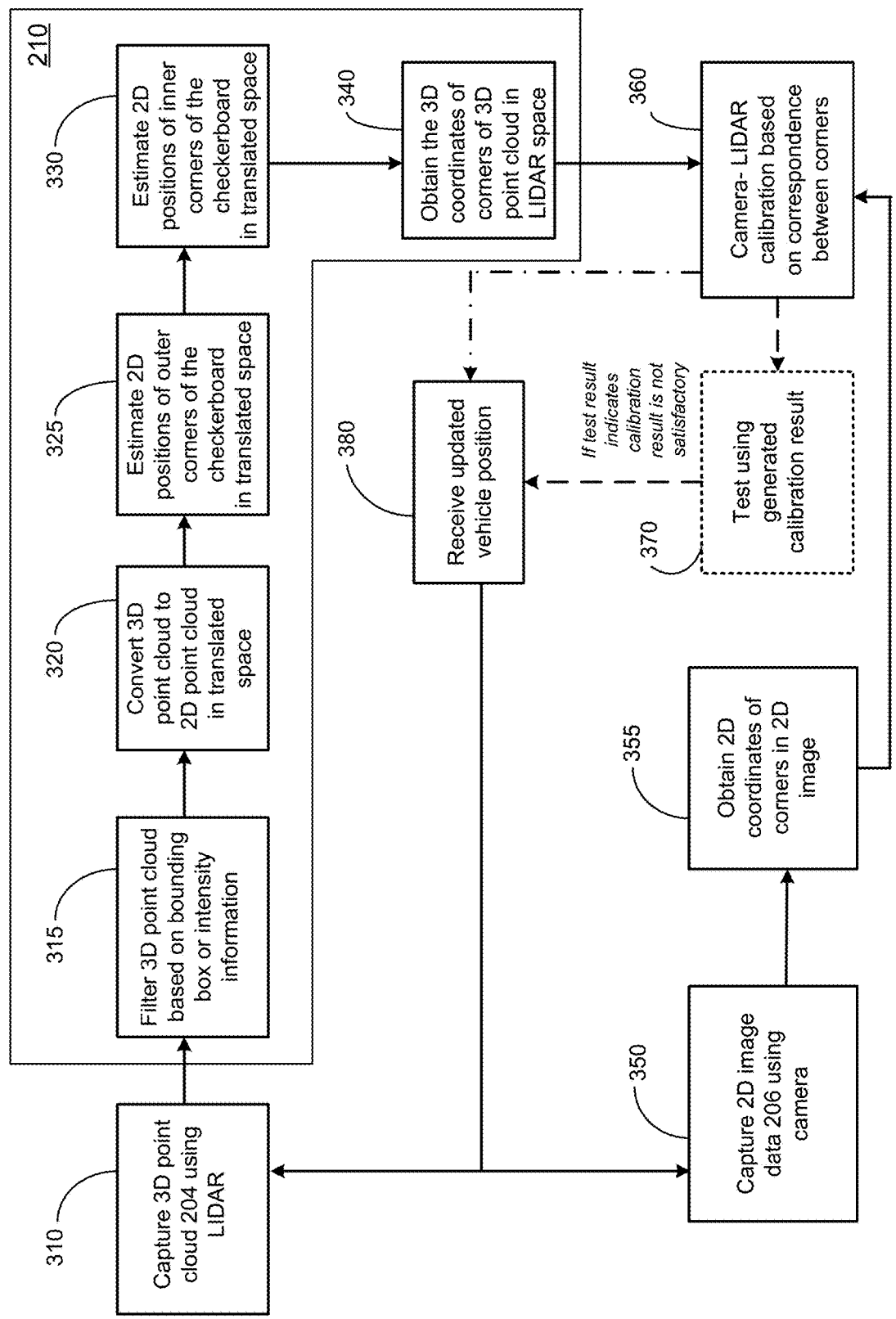
FIG. 3 is a block diagram that illustrates an example process for camera-LIDAR calibration using a corner-estimation method.
Figure 4:
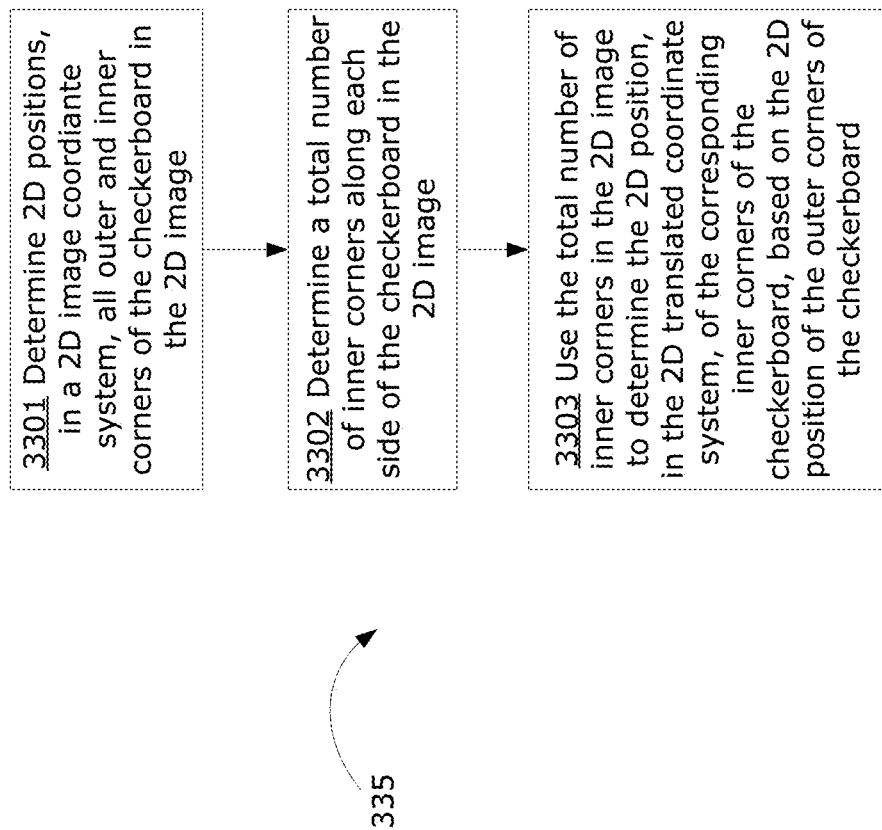
FIG. 4 is a flowchart illustrating an example corner-estimation method.
Figure 5A:
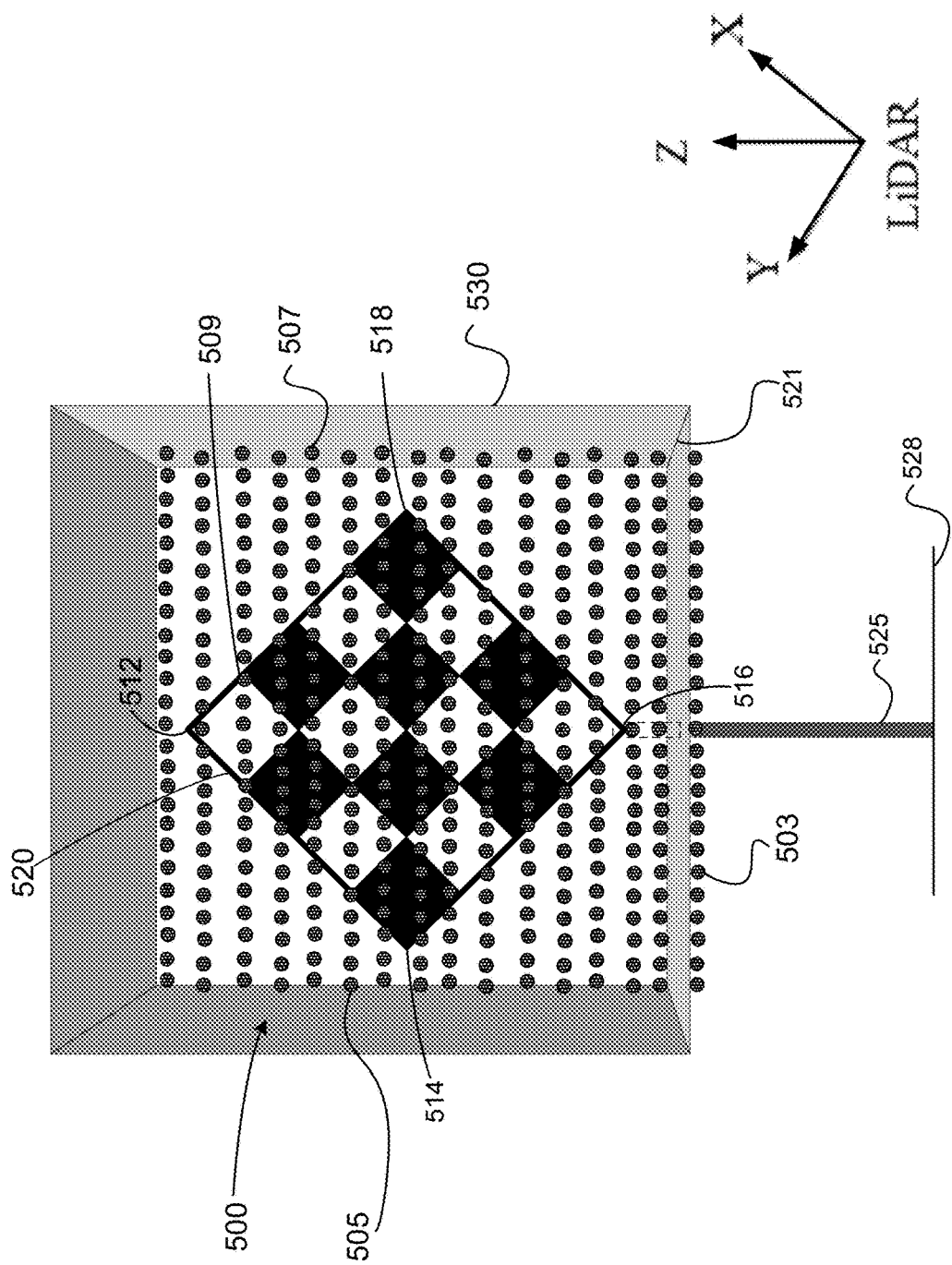
FIG. 5A is a diagram that illustrates an example checkerboard being scanned by a LIDAR scanner.
Figure 5B:
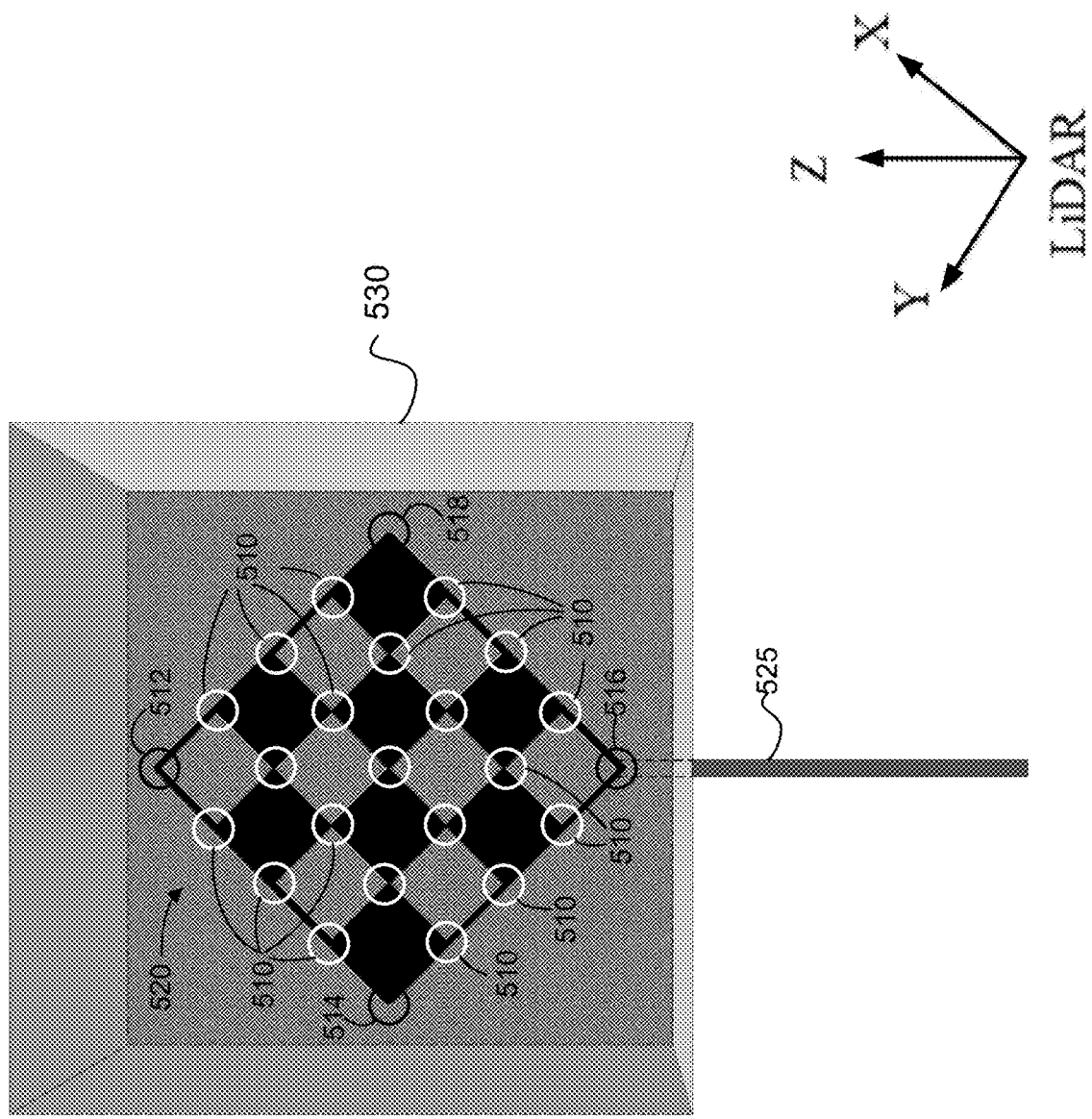
FIG. 5B is a diagram that illustrates an example checkerboard being used for camera-LIDAR calibration using a corner-estimation method.

FIG. 3 is a block diagram that illustrates an example process 300 performed by the processing device 170 based on instructions stored in memory 180, for camera-LIDAR calibration using a corner-estimation method, in accordance with example embodiments described herein. In describing the processes shown in FIGS. 3 and 4, references to FIGS. 5A and 5B are made. FIG. 5A is a diagram that illustrates an example checkerboard being scanned by a LIDAR scanner. FIG. 5B is a diagram that illustrates an example checkerboard being used for camera-LIDAR calibration using a corner-estimation method.

At 310, also shown in FIG. 5A, the LIDAR unit 114 of the vehicle 100 captures a planar checkerboard 520 (hereinafter "CKB 520") in a 3D point cloud data 204. Initially, the position of the CKB 520 is known. For example, the CKB 520 may be placed approximately 2 meters away from the vehicle 100. The exact distance between the CKB 520 and the vehicle 100 may be pre-determined and set by a human prior to the calibration process. The size of the CBK 520 is large enough to receive multiple laser beams from the LIDAR unit 114, and the checkerboard pattern stands out compared to the background. A CKB 520 has multiple squares of alternating colors, such as black and white. In some embodiments, as further explained below, the black squares may have a very low intensity value when scanned by a LIDAR laser beam, and the white squares may have a very high intensity value when scanned by a LIDAR laser beam. As shown in FIG. 5A, the CKB 520 is supported by a post 525 which is fixed to the ground 528. The CKB 520 may be of a square shape with four sides and four outer corners. Each pair of opposing outer corners (e.g. corners 512, 516) defines a diagonal of the CKB 520. In some embodiments, the CKB 520 can be positioned such that one of its diagonals is perpendicular (the "vertical diagonal") to the ground 528, and that the two opposing outer corners 512, 516 on either end of the vertical diagonal are each referred to as a top corner 512 or a bottom corner 516, while the other two opposing outer corners on either end of the other diagonal are each referred to as a left corner 514 or a right corner 516 of the CKB 520.

A 3D scan, or 3D point cloud 500, is generated by the LIDAR unit 114 by sweeping multiple laser beams across the CKB 520. The 3D point cloud 500 may also be referred to as 3D data 500 and has multiple laser points or data points 505. Some of the 3D data points 505, such as 3D data point 509, may represent a hit on the target—that is, the CKB 520 itself, while some of the 3D data points 505, such as 3D data point 507, may represent a hit on an object that is not the CKB 520.

Steps 315, 320, 325, 330 and 340 are steps performed by the processing device 170 to perform the sub-process 210 from FIG. 2. At 315, 3D point cloud 500 is filtered. The filtering process may be based on a bounding box process, or based on intensity of the data points 505. In terms of the bounding box process, a bounding box 530 is known based on an approximate initial state information and a clearance gap around the CKB 520. For example, the approximate initial state information may include a general location of the CKB 520 relative to the vehicle 100, such as x meters and directly in front of (or slightly to the right of) vehicle 100. The approximate initial state information may also include a size (length, width and depth) of the CKB 520. In the case of a square, the length and width may be identical for the CKB 520. The CKB 520 typically has a depth that is a lot less compared to the length of its four sides. An example size of the CKB 520 can be 1.5 m×1.5 m×0.1 m. In addition, the CKB 520 is usually placed such that there are no other objects within a certain distance or radius from the CKB 520 in all directions. The distance or radius may be referred to as a clearance gap 521. For example, the clearance gap 521 may be 1 to 3 meters. The size of the CKB 520 and the clearance gap 521 may be used to define the bounding box 530, which is configured to include the CKB 520 and its immediate surroundings. As the general location of the CKB 520 is known, the bounding box 530 is superimposed with the CKB 520 with the center of the bounding box 530 placed at the center of the CKB 520. 3D data points 503 falling outside of the bounding box 530 may be eliminated during the filtering process, since these data points 503 are most likely not representations of the CKB 520.

In some embodiments, if the vehicle 100 has moved from an original position, based on which an initial 3D bounding box has been determined, then once the processing device 170 has received an updated position of the vehicle 100, the 3D bounding box may be updated accordingly using real-time or near real-time vehicle odometry data such as data from wheel odometry, LOAM and IMU.

As mentioned, as an alternative to the bounding box process, or as an additional filtering technique, intensity channel information of the 3D point cloud 500 may be used to filter the 3D point cloud 500. Each 3D data point 505 of the 3D point cloud 500 may include a respective intensity value associated with the data point, which represents how much light (or signal) has been reflected back to the LIDAR unit 114 once the laser beam has hit an object. For objects of shiny metals, such as aluminum, the amount of the reflected signal is relatively high, hence a high intensity value is stored for data points hitting reflective, shiny objects. For non-reflective objects, the reflected signal would be low, hence a low intensity value is stored for data points hitting non-reflective surfaces, such as dark wood.

In some embodiments, when the checkerboard pattern of the CKB 520 is built from both highly reflective material and non-reflective material, i.e., shiny metal (e.g. aluminum) for white squares and non-reflective material (e.g. dark wood) for black squares, and when this pattern is unique in the immediate surroundings of the CKB 520, the highly reflective/non-reflective checkerboard pattern can then be readily detected both in camera space and LIDAR coordinate system. Therefore, any data point in the 3D point cloud 500 that does not have a high intensity value matching that of the reflective material in the CKB 520, nor a low intensity value matching that of the non-reflective material in the CKB 520, may be filtered out.

Next, the filtered 3D point cloud may be processed to further eliminate data points that do not represent the CKB 520. Each 3D data point 505 of the 3D point cloud 500 can include a LIDAR beam number. Alternatively, the beam number Bn may be calculated based on the following equation:

$$B_n = \left\lfloor \left\{ \left[ \arcsin\left( \frac{z}{\sqrt{x^2 + y^2 + z^2}} \right) \right] \middle/ d_\theta \right\} \right\rfloor$$

Where $d_\theta$ is the angular distance between two adjacent beams, and can be calculated based on the following equation:

$d_\theta$ = vertical angular range/the total number of beams.

As LIDAR sweeps the beams while operating, the LIDAR's field of view (FOV) is generally defined based on the range of horizontal and vertical angles through which it can capture data. A typical field of view can be, for example, within 30 to 180 degrees in the vertical direction (vertical angular range) and 360 degrees in the horizontal direction (horizontal angular range).

Once a corresponding beam number for each 3D data point in the filtered 3D data point has been obtained, the data points belonging to certain beams can be removed ("outliner data points"). For example, data points in beams having only a certain amount or less of data points (e.g. 3 data points or less), or data points in beams where the distance between farthest data points is less than a threshold (e.g. 0.05 m) can be removed during this process, since these outliner data points most likely represent objects (e.g. post 525) other than the CKB 520. At this point the remaining 3D data points mainly represents the board surface of the CKB 520.

At 320, the filtered 3D point cloud is converted to a two-dimensional (2D) point cloud in a translated 2D coordinate system. Each data point in the filtered 3D point cloud has a corresponding 2D position in the 2D point cloud. Each 2D position is a 2D projection of the corresponding 3D point cloud in the translated 2D coordinate system. Through this 3D-to-2D projection process, the 3D data points representing the checkerboard surface in 3D are flattened and mapped to 2D, in some embodiments, by applying a Principal Component Analysis (PCA) process based dimensionality reduction. When the PCA process is applied, the three principal components (PCs) may represent the length, width and depth of the CKB 520. The PC representing the length has the largest value, the PC representing the width may either have an identical value as the PC representing the length in the case of a square checkerboard, or it may have a value that is second largest among all three PCs in the case of a rectangular checkerboard, and the PC representing the depth would be much smaller compared to the other two PCs, assuming the depth is small comparing to the length and width of the CKB 520. Through the PCA process, the PC (depth in this case) with the smallest value is dropped, and the final 2D point cloud now represents the CKB 520 in the translated 2D space, with minimal loss of information.

At 325, 2D positions of outer corners of the checkerboard in translated coordinate system are determined. For example, this can be done by fitting a 2D bounding box, constructed from the length/width information of the CKB 520, on the 2D point cloud in the translated coordinate system. The 2D bounding box outlines the checkerboard pattern and the 2D positions (e.g. X, Y coordinates in the translated coordinate system) of the outer corners 512, 514, 516, 518 can then be obtained in the translated coordinate system.

At 330, 2D positions of inner corners of the checkerboard in the translated coordinate system are determined. FIG. 4 is a flowchart illustrating an example corner-estimation method 335. At 3301, the processing device 170 can determine 2D positions, in a 2D image coordinate system, of both outer corners 512, 514, 516, 518 and inner corners 510 of the CKB 520 in the 2D image by using a corner detection method to spot intersections of black and white squares in the 2D image, see FIG. 5B.

At 3302, a total number of inner corners 510 along each side of the CKB 520 can be counted based on the 2D image. At 3303, using an interpolation process, the total number of inner corners 510 along each side of the CKB 520 (3 in the illustrated example in FIG. 5B) in the 2D image can be used to determine the 2D position of the corresponding inner corners 510 of the CKB 520 in the translated 2D coordinate system, based on the respective 2D positions of the outer corners 512, 514, 516, 518 of the CKB 520 in the translated 2D coordinate system. For example, based on an image process of the 2D image of the CKB 520, the processing device 170 determines that there are a total number of 3 inner corners alongside each side of the CKB 520, and based on the information that the corners (including outer and inner corners) along one side of CKB 520 are equally spaced apart, the 2D positions of the inner corners 510 of the CKB 520 can be calculated in the translated 2D coordinate system, since the 2D positions in the translated 2D coordinate system of the outer corners 512, 514, 516, 518 have been determined in step 325.

At 340, the 3D coordinates of all corners 510, 512, 514, 516, 518 of the CKB 520 in the LIDAR coordinate system can be obtained by application of inverse PCA transformation on the 2D positions of corresponding corners 510, 512, 514, 516, 518 in the translated 2D coordinate system, with the assumption that the third principle component (e.g. depth) in the reduced space is zero.

At 350, 2D image of the CKB 520 from the camera 116 of the vehicle 100 is obtained by the processing device 170. Note this step may be performed any time before step 355, which may be performed any time before step 360.

At 355, the processing device 170 may use sub-process 220 to determine and store 2D positions, in a 2D image coordinate system (e.g. a XY planar coordinate system) of both outer corners 512, 514, 516, 518 and inner corners 510 of the CKB 520 in the 2D image by using a corner detection method to spot intersections of black and white squares in the 2D image.

At 360, the processing device 170 may use sub-process 230 to generate a calibration result based on the 1-to-1 relationship between the 3D position and the 2D position of each outer corner 512, 514, 516, 518 and of each inner corner 510 of the CKB 520. The calibration result may be generated using any suitable optimization method, such as the Levenberg-Marquardt optimization. The generated calibration result may be a matrix, such as a transformation matrix H or a camera projection matrix P, configured to generate a corresponding 2D position in a 2D image coordinate system based on a given 3D position in the LIDAR coordinate system. The transformation matrix H may include a rotation matrix R and a translation matrix T, as described in detail above.

Optionally, at step 370, the processing device 170 may perform a test of the calibration result by:
1) generating a calibrated 2D position in the 2D image coordinate system, using the generated calibration result (e.g. transformation matrix H including a rotation matrix R and a translation matrix T), for each of a plurality of corners of the CKB 520 based on the respective 3D position of the respective corner from the plurality of corners of the CKB 520, the plurality of corners including a plurality of the outer corners 512, 514, 516, 518 of the checkerboard and a plurality of the inner corners 510 of the checkerboard;
2) calculating, for each of the plurality of corners 510, 512, 514, 516, 518 of the CKB 520, a calibration error between the calibrated 2D position and the previously determined 2D position of the corner in the 2D image coordinate system; and
3) generating a mean squared error based on the calculated errors for all of the plurality of corners 510, 512, 514, 516, 518 of the CKB 520.

If the processing device 170 determines that additional calibration is required based on the mean squared error calculated above, it may send command to cause the vehicle 100 to move to a next position at step 380, and obtain 3D point cloud and 2D image data of the checkerboard based on the updated vehicle position, and start the calibration process again starting from step 310.

In some embodiments, instead of performing a test using the generated calibration result after every frame of 3D point cloud, the processing device 170 may wait until a sufficient amount of data points are collected (e.g. ten 3D point cloud and ten corresponding 2D images) before generating the calibration result, where the camera-LIDAR calibration matrices are calculated based on all data points from all frames with different distances and different angles, using optimization methods such as Levenberg-Marquardt optimization. Once the calibration result is generated based on multiple sets of corresponding 2D image data and 3D point clouds, a test may be performed on the calibrated 2D positions, similar to the test described above. The camera-LIDAR calibration process may be iterative, continuing until a) a maximum of captured frames has been reached; or b) a test per step 370 on calibration result reaches a minimum threshold.

In some embodiments, the processing device 170 may wait until a sufficient amount of data points are collected before generating the calibration result, where the camera-LIDAR calibration matrices are calculated based on all data points from all frames with different distances and different angles, using an optimization method such as Levenberg-Marquardt optimization. For example, the processing device 170 may be instructed to wait until i (e.g. 10) frames of 3D point cloud and j (e.g. 10) frames of corresponding 2D images have been collected prior to performing the calibration process. In some embodiments, the processing device 170 may configure the variables i and j in real time or near real-time based on a threshold, such as a margin of error (e.g. the mean squared error described above) obtained from a previous round of calibration. For example, if the mean squared error from a previous round of calibration process exceeds a predefined threshold, the processing device 170 may adjust the values of i and j, so that a greater amount of data points are collected for the next round(s) of calibration process, in order to reduce the mean squared error and optimize the calibration result.

In some embodiments, to obtain better accuracy for the camera-LIDAR calibration, multiple frames of 2D images and corresponding 3D point clouds of the CKB 520 may be required, with each frame based on a different location or a different angle. For example, the CKB 520 may be stationary, and the vehicle 100 may receive command from the processing device 170 to move to a different location for each new frame of data, in some cases the vehicle 100 may move to a location with a different angle in respect to the CKB 520. This way, the approximate location of the CKB 520, as well as the 3D bounding box may be obtained for each new frame of data, by using real-time or near real-time data from vehicle odometry including wheel odometry, IMU sensor, and LOAM (LIDAR odometry and mapping). For example, by comparing two or more consecutive LIDAR frames from the LIDAR unit, as well as observing wheel movements from the wheel odometry unit, the processing device 170 may determine a direction and distance of the vehicle's physical movements.

Figure 6:
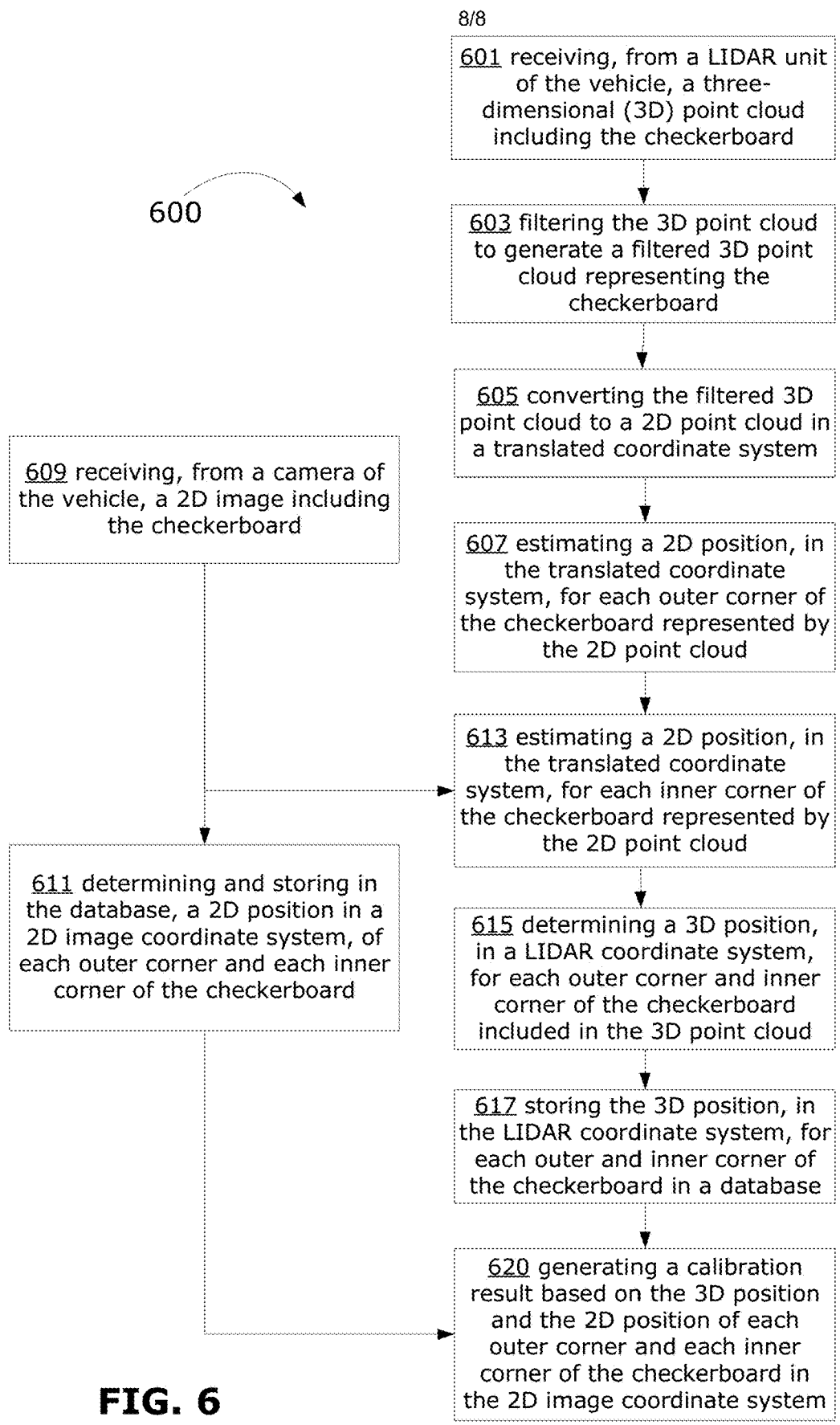
FIG. 6 is a flowchart illustrating an example method for camera-LIDAR calibration using a corner-estimation method.

FIG. 6 is a flowchart illustrating an example embodiment of a method 600 for camera-LIDAR calibration, using a corner-estimation method. The method 600 may be implemented in software executed, for example, by the processing unit 172 of the processing device 170. Coding of software for carrying out such a method 600 is within the scope of a person of ordinary skill in the art provided the present disclosure. The method 600 may contain additional or fewer processes than shown and/or described, and may be performed in a different order. Machine readable code executable by the processing unit 172 to perform the method 600 may be stored in a non-transitory machine readable medium, such as the memory 180, of the processing device 170. Alternatively, the method 600 may be implemented in software modules, which may be part of the computer vision system 120.

At 601, the processing device 170 receives, from a LIDAR unit of the vehicle, a three-dimensional (3D) point cloud including the checkerboard is received from the LIDAR unit 114. Concurrently or any time after step 601 but before step 613, at step 609, the processing device 170 may receive, from a camera of the vehicle, a 2D image including the checkerboard.

At 603, the processing device 170 filters the 3D point cloud to generate a filtered 3D point cloud. In some embodiments, the filtering process may be performed based on a bounding box, which may be determined based on a position of the vehicle, a position of the checkerboard, and a size of the checkerboard. In some embodiments, the filtering process may be performed based on an intensity value associated with each data point in the 3D point cloud.

At 605, the processing device 170 converts the filtered 3D point cloud to a 2D point cloud in a translated coordinate system, for example, by using a Principal Component Analysis (PCA) process.

At 607, the processing device 170 estimates a 2D position, in the translated coordinate system, for each outer corner of the checkerboard represented by the 2D point cloud. This can be done by fitting a 2D bounding box, constructed from the length/width information of the CKB 520, on the 2D point cloud in the translated coordinate system.

At 611, the processing device 170 determines and stores, in the database, a 2D position, in a 2D image coordinate system, of each outer corner and each inner corner of the checkerboard in the 2D image. This step may be performed any time between step 609 and 620. The 2D image coordinate system may be, for example, the above-mentioned camera coordinate system.

At 613, the processing device 170, based on the 2D image, estimates a 2D position in the translated coordinate system, for each inner corner of the checkerboard represented by the 2D point cloud. In some embodiments, the processing device 170 may determine a total number of inner corners along each side of the checkerboard in the 2D image, and use the total number of inner corners along each side of the checkerboard in the 2D image to determine the 2D position of the corresponding inner corners of the checkerboard in the translated coordinate system based on the 2D position of the outer corners of the checkerboard in the translated coordinate system.

At 615, the processing device 170 determines and stores, in the database, a 3D position, in the LIDAR coordinate system, for each outer corner of the checkerboard in the 3D point cloud based on the 2D position for the corresponding outer corner in the translated coordinate system.

At 617, the processing device 170 determines and stores, in the database, a 3D position, in the LIDAR coordinate system, for each inner corner of the checkerboard in the 3D point cloud based on the 2D position for the corresponding inner corner in the translated coordinate system.

At 620, the processing device 170 may generate a calibration result based on the 3D position and the 2D image position of each outer corner and each inner corner of the checkerboard, where the generated calibration result comprises a matrix, such as a transformation matrix H or a camera projection matrix P, configured to generate a corresponding 2D image position based on a given 3D position in the LIDAR coordinate system. The transformation matrix H may include a rotation matrix R and a translation matrix T.

Optionally, the processing system 170 may perform a test of the calibration result by:
1) generating a calibrated 2D position in a 2D image coordinate system, using the generated calibration result, for each of a plurality of corners of the checkerboard based on the respective 3D position of the respective corner from the plurality of corners of the checkerboard, the plurality of corners including a plurality of the outer corners of the checkerboard and a plurality of the inner corners of the checkerboard;
2) calculating, for each of the plurality of corners of the checkerboard, a calibration error between the calibrated 2D position and the 2D position of the corner in the 2D image coordinate system; and
3) generating a mean squared error based on the calculated errors for all of the plurality of corners of the checkerboard.

If the processing device 170 determines that additional calibration is required based on the mean squared error calculated above, the processing device 170 sends command or instruction to the vehicle control system which causes the vehicle 100 to move to a next position, and obtain 3D point cloud and 2D image data of the checkerboard based on the updated vehicle position, and start the calibration process again starting from step 601.

In some embodiments, the processing device 170 may wait until a sufficient amount of data points are collected before generating the calibration result, where the camera-LIDAR calibration matrices are calculated based on all data points from all frames with different distances and different angles, using an optimization method such as Levenberg-Marquardt optimization. For example, the processing device 170 may be instructed to wait until i (e.g. 10) frames of 3D point cloud and j (e.g. 10) frames of corresponding 2D images have been collected prior to performing the calibration process. In some embodiments, the processing device 170 may configure the variables i and j in real time or near real-time based on a threshold, such as a margin of error (e.g. the mean squared error described above) obtained from a previous round of calibration. For example, if the mean squared error from a previous round of calibration process exceeds a predefined threshold, the processing device 170 may adjust the values of i and j, so that a greater amount of data points are collected for the next round(s) of calibration process, in order to reduce the mean squared error and optimize the calibration result.

The embodiments described in the present disclosure can be implemented to calibrate between a LIDAR unit and a camera on a vehicle in a reliable and efficient manner. The described system and method can be used to calibrate based on sparse 3D point cloud data, and the calibration result is generated using less computational resources than conventional calibration methods such as the known KITT toolset. The described embodiments are suitable for camera-LIDAR calibration on a commercial or industrial level, where large fleets of autonomous vehicles require robust calibration results between a camera unit and a LIDAR unit using as few computational resources as possible. For example, by using an interpolation technique to determine 2D positions for outer and inner corners of a checkerboard in a translated 2D coordinate system based on respective 2D positions of each corner in a 2D image coordinate system, the described calibration process can be performed quickly. For another example, multiple 3D point clouds and corresponding 2D image data can be collected and matched by the described system to ensure a robustness of the calibration result. Furthermore, an optional testing step, in which the generated calibration result is used to generate a calibrated 2D position that is tested against the recorded 2D position in a 2D image coordinate system, can be leveraged to further optimize the calibration result based on a margin of error in the present embodiments.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for performing camera Light Detection and Ranging (LIDAR) calibration based on a checkerboard placed in proximity to a vehicle, the method comprising:
   receiving, from a LIDAR unit of the vehicle, a three-dimensional (3D) point cloud including the checkerboard;
   receiving, from a camera of the vehicle, a 2D image including the checkerboard;
   filtering the 3D point cloud to generate a filtered 3D point cloud representing the checkerboard;
   converting the filtered 3D point cloud representing the checkerboard to a 2D point cloud representing the checkerboard in a translated coordinate system;
   estimating a 2D position, in the translated coordinate system, for each outer corner of the checkerboard represented by the 2D point cloud;
   estimating a 2D position in the translated coordinate system for each inner corner of the checkerboard represented by the 2D point cloud;
   determining and storing in a database, a 3D position, in a LIDAR coordinate system, for each outer corner of the checkerboard included in the 3D point cloud based on the 2D position for the corresponding outer corner in the translated coordinate system;
   determining and storing in the database, a 3D position, in the LIDAR coordinate system, for each inner corner of the checkerboard included in the 3D point cloud based on the 2D position for the corresponding inner corner in the translated coordinate system; and
   determining and storing in the database, a 2D position of each outer corner and each inner corner of the checkerboard in a 2D image coordinate system.

2. The method of claim 1, further comprising generating a calibration result based on the 3D position in the LIDAR coordinate system and the 2D position in the 2D image coordinate system of each outer corner and each inner corner of the checkerboard, wherein the generated calibration result is a transformation matrix.

3. The method of claim 2, further comprising generating a calibrated 2D position in the 2D image coordinate system, using the generated calibration result, for each of a plurality of corners of the checkerboard based on the respective 3D position of the respective corner from the plurality of corners of the checkerboard, the plurality of corners comprising a plurality of the outer corners of the checkerboard and a plurality of the inner corners of the checkerboard.

4. The method of claim 3, further comprising:
   calculating, for each of the plurality of corners of the checkerboard, a calibration error between the calibrated 2D position and the 2D position of the corner;
   generating a mean squared error based on the calculated errors for all of the plurality of corners of the checkerboard; and
   determining if additional 3D point cloud and 2D image including the checkerboard from a new vehicle position are required based on comparing the mean squared error with a threshold.

5. The method of claim 1, further comprising, in an iterative manner:

receiving a new position of the vehicle;
receiving, from the LIDAR unit of the vehicle, a second three-dimensional (3D) point cloud including the checkerboard;
receiving, from a camera of the vehicle, a second 2D image including the checkerboard;
filtering the second 3D point cloud to generate a second filtered 3D point cloud representing the checkerboard based on the new position of the vehicle;
converting the second filtered 3D point cloud representing the checkerboard to a second 2D point cloud representing the checkerboard in a translated coordinate system;
estimating a 2D position, in the translated coordinate system, for each outer corner of the checkerboard represented by the second 2D point cloud;
estimating a 2D position in the translated coordinate system, for each inner corner of the checkerboard represented by the second 2D point cloud;
determining and storing in the database, a 3D position, in a LIDAR coordinate system, for each outer corner of the checkerboard included in the second 3D point cloud based on the 2D position for the corresponding outer corner in the translated coordinate system;
determining and storing in the database, a 3D position, in the LIDAR coordinate system, for each inner corner of the checkerboard included in the second 3D point cloud based on the 2D position for the corresponding inner corner in the translated coordinate system; and
determining and storing in the database, a 2D position of each outer corner and each inner corner of the checkerboard in a 2D image coordinate system.

6. The method of claim 5, further comprising:
generating a calibration result based on the 3D positions in the LIDAR coordinate system and the 2D positions in the 2D image coordinate system stored in the database for the checkerboard across all 3D point clouds and corresponding 2D positions of the checkerboard;
generating a calibrated 2D position, using the generated calibration result, for each of a plurality of corners of the checkerboard based on the respective 3D position of the respective corner from the plurality of corners of the checkerboard stored in the database, the plurality of corners comprising a plurality of the outer corners of the checkerboard and a plurality of the inner corners of the checkerboard;
generating a mean squared error based on a plurality of calculation errors, each calculation error computed between the calibrated 2D position and a corresponding 2D position of each respective corner from the plurality of corners of the checkerboard stored in the database; and
determining if additional 3D point cloud and 2D image including the checkerboard based on another new vehicle position are required based on comparing the mean squared error with a threshold.

7. The method of claim 1, wherein filtering the 3D point cloud comprises:
determining a bounding box that includes the checkerboard based on a position of the vehicle; and
filtering out the 3D data points outside of the bounding box.

8. The method of claim 1, wherein converting the filtered 3D point cloud to the 2D point cloud in the translated coordinate system comprises executing a Principal Component Analysis (PCA) method to eliminate a dimension representing a depth of the checkerboard.

9. The method of claim 1, wherein estimating the 2D position in the translated coordinate system, for each inner corner of the checkerboard represented by the 2D point cloud comprises:
determining a total number of inner corners along each side of the checkerboard included in the 2D image; and
determining the 2D position of the corresponding inner corners of the checkerboard by interpolating, using the total number of inner corners along each side of the checkerboard in the 2D image in the translated coordinate system, the 2D position of the outer corners of the checkerboard in the translated coordinate system.

10. A processing system for performing calibration of a camera and a light detection and ranging (LIDAR) scanning sensor of a vehicle, the processing system comprising:
a processing unit; and
a memory coupled to the processing unit, the memory storing machine-executable instructions that, when executed by the processing unit, cause the processing system to:
receive, from a LIDAR unit of the vehicle, a 3D point cloud including the checkerboard;
receive, from a camera of the vehicle, a 2D image including the checkerboard;
filter the 3D point cloud to generate a filtered 3D point cloud representing the checkerboard;
convert the filtered 3D point cloud representing the checkerboard to a 2D point cloud representing the checkerboard in a translated coordinate system;
estimate a 2D position, in the translated coordinate system, for each outer corner of the checkerboard represented by the 2D point cloud;
estimate a 2D position in the translated coordinate system, for each inner corner of the checkerboard represented by the 2D point cloud;
determine and store in a database, a 3D position, in a LIDAR coordinate system, for each outer corner of the checkerboard included in the 3D point cloud based on the 2D position for the corresponding outer corner in the translated coordinate system;
determine and store in the database, a 3D position, in the LIDAR coordinate system, for each inner corner of the checkerboard included in the 3D point cloud based on the 2D position for the corresponding inner corner in the translated coordinate system; and
determine and store in the database, a 2D position of each outer corner and each inner corner of the checkerboard in a 2D image coordinate system.

11. The system of claim 10, wherein the instructions, when executed by the processing unit, cause the apparatus to generate a calibration result based on the 3D position in the LIDAR coordinate system and the 2D position in the 2D image coordinate system of each outer corner and each inner corner of the checkerboard, and wherein the generated calibration result is a transformation matrix.

12. The system of claim 11, wherein the instructions, when executed by the processing unit, cause the apparatus to generate a calibrated 2D position in the 2D image coordinate system, using the generated calibration result, for each of a plurality of corners of the checkerboard based on the respective 3D position of the respective corner from the plurality of corners of the checkerboard, the plurality of corners comprising a plurality of the outer corners of the checkerboard and a plurality of the inner corners of the checkerboard.

13. The system of claim 12, wherein the instructions, when executed by the processing unit, cause the apparatus to:
calculate, for each of the plurality of corners of the checkerboard, a calibration error between the calibrated 2D position and the 2D position of the corner;
generate a mean squared error based on the calculated errors for all of the plurality of corners of the checkerboard; and
determine if additional 3D point cloud and 2D including the checkerboard from a new vehicle position are required based on comparing the mean squared error with a threshold.

14. The system of claim 10, wherein the instructions, when executed by the processing unit, cause the apparatus to, in an iterative manner:
receive a new position of the vehicle;
receive, from the LIDAR unit of the vehicle, a second three-dimensional (3D) point cloud including the checkerboard;
receive, from a camera of the vehicle, a second 2D image including the checkerboard;
filter the second 3D point cloud to generate a second filtered 3D point cloud representing the checkerboard based on the new position of the vehicle;
convert the second filtered 3D point cloud representing the checkerboard to a second 2D point cloud representing the checkerboard in a translated coordinate system;
estimate a 2D position, in the translated coordinate system, for each outer corner of the checkerboard represented by the second 2D point cloud;
estimate a 2D position in the translated coordinate system, for each inner corner of the checkerboard represented by the second 2D point cloud;
determine and store in the database, a 3D position, in a LIDAR coordinate system, for each outer corner of the checkerboard included in the second 3D point cloud based on the 2D position for the corresponding outer corner in the translated coordinate system;
determine and store in the database, a 3D position, in the LIDAR coordinate system, for each inner corner of the checkerboard included in the second 3D point cloud based on the 2D position for the corresponding inner corner in the translated coordinate system; and
determine and store in the database, a 2D position of each outer corner and each inner corner of the checkerboard in a 2D image coordinate system.

15. The system of claim 14, wherein the instructions, when executed by the processing unit, cause the apparatus to:
generate a calibration result based on the 3D positions in the LIDAR coordinate system and the 2D positions in the 2D image coordinate system stored in the database for the checkerboard across all 3D point clouds and corresponding 2D positions of the checkerboard;
generate a calibrated 2D position, using the generated calibration result, for each of a plurality of corners of the checkerboard based on the respective 3D position of the respective corner from the plurality of corners of the checkerboard stored in the database, the plurality of corners comprising a plurality of the outer corners of the checkerboard and a plurality of the inner corners of the checkerboard;
generate a mean squared error based on a plurality of calculation errors, each calculation error computed between the calibrated 2D position and a corresponding 2D position of each respective corner from the plurality of corners of the checkerboard stored in the database; and
determine if additional 3D point cloud and 2D including the checkerboard based on another new vehicle position are required based on comparing the mean squared error with a threshold.

16. The system of claim 10, wherein filtering the 3D point cloud comprises:
determining a bounding box that includes the checkboard based on a position of the vehicle; and
filtering out the 3D data points outside of the bounding box.

17. The system of claim 10, wherein converting the filtered 3D point cloud to the 2D point cloud in the translated coordinate system comprises executing a Principal Component Analysis (PCA) method to eliminate a dimension representing a depth of the checkerboard.

18. The system of claim 10, wherein estimating the 2D position in the translated coordinate system, for each inner corner of the checkerboard represented by the 2D point cloud comprises:
determining a total number of inner corners along each side of the checkerboard included in the 2D image; and
determining the 2D position of the corresponding inner corners of the checkerboard by interpolating, using the total number of inner corners along each side of the checkerboard in the 2D image in the translated coordinate system, based on the 2D position of the outer corners of the checkerboard in the translated coordinate system.

19. A non-transitory machine readable medium having tangibly stored thereon executable instructions for execution by at a processor of a vehicle control system of a vehicle to:
receive, from a Light Detection and Ranging (LIDAR) unit of the vehicle, a 3D point cloud including the checkerboard;
receive, from a camera of the vehicle, a 2D image including the checkerboard;
filter the 3D point cloud to generate a filtered 3D point cloud representing the checkerboard;
convert the filtered 3D point cloud representing the checkerboard to a 2D point cloud representing the checkerboard in a translated coordinate system;
estimate a 2D position, in the translated coordinate system, for each outer corner of the checkerboard represented by the 2D point cloud;
estimate a 2D position in the translated coordinate system, for each inner corner of the checkerboard represented by the 20 point cloud;
determine and store in a database, a 3D position, in a LIDAR coordinate system, for each outer corner of the checkerboard included in the 3D point cloud based on the 2D position for the corresponding outer corner in the translated coordinate system;
determine and store in the database, a 3D position, in the LIDAR coordinate system, for each inner corner of the checkerboard in the 3D point cloud based on the 2D position for the corresponding inner corner in the translated coordinate system; and
determine and store in the database, a 2D position of each outer corner and each inner corner of the checkerboard in a 2D image coordinate system.

20. The non-transitory machine readable medium of claim 10, having tangibly stored thereon further executable instructions to generate a calibration result based on the 3D position in the LIDAR coordinate system and the 2D position in the 2D image coordinate system of each outer corner and each inner corner of the checkerboard, wherein the generated calibration result is a transformation matrix.

* * * * *

UNITED STATES PATENT AND TRADEMARK OFFICE
CERTIFICATE OF CORRECTION

PATENT NO. : 10,859,684 B1
APPLICATION NO. : 16/681447
DATED : December 8, 2020
INVENTOR(S) : Amirhosein Nabatchian Page 1 of 1

It is certified that error appears in the above-identified patent and that said Letters Patent is hereby corrected as shown below:

In the Claims

In Column 26, Line 50 (Claim 19): by the 20 point cloud; should read by the 2D point cloud;

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*